Figure 1:
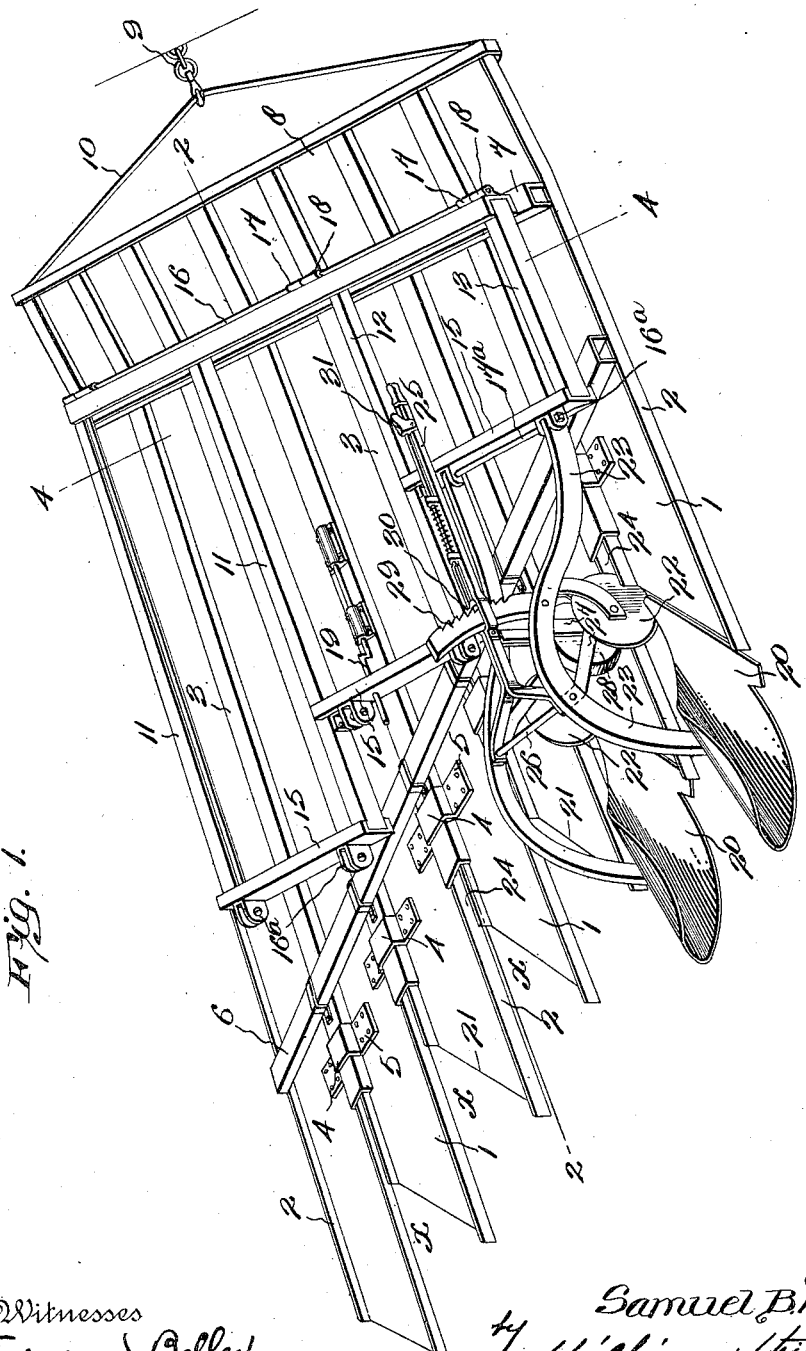

S. B. McCORMICK.
CULTIVATOR.
APPLICATION FILED FEB. 10, 1913.

1,078,634.

Patented Nov. 18, 1913.
2 SHEETS—SHEET 1.

Witnesses
Edwin J. Beller.
H. H. Byrne.

Inventor
Samuel B. McCormick
by Wilkinson, Winterson
& Mackaye
Attorney

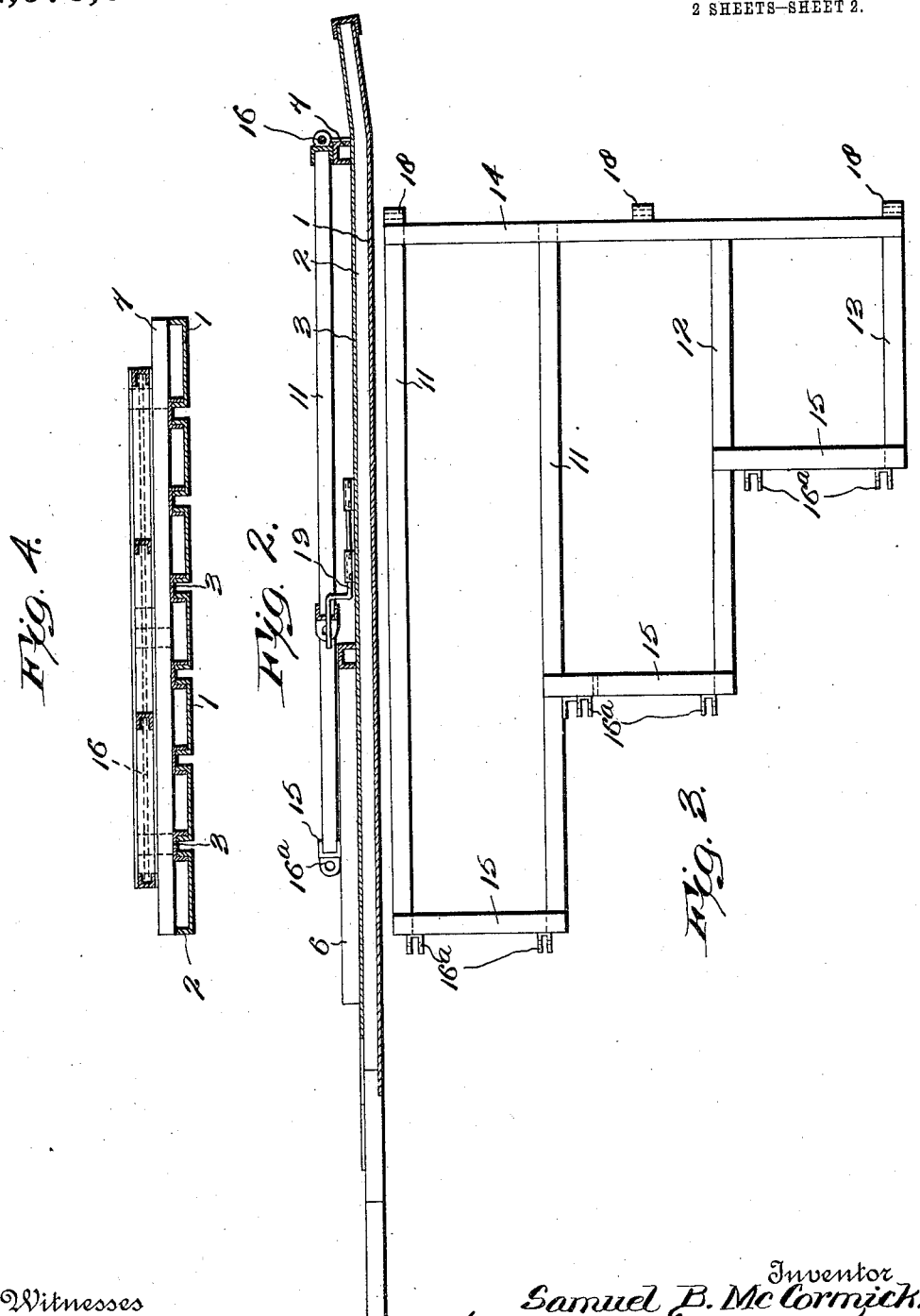

UNITED STATES PATENT OFFICE.

SAMUEL B. McCORMICK, OF OTTERBEIN, INDIANA.

CULTIVATOR.

1,078,634.    Specification of Letters Patent.    Patented Nov. 18, 1913.

Application filed February 10, 1913. Serial No. 747,550.

*To all whom it may concern:*

Be it known that I, SAMUEL B. McCORMICK, a citizen of the United States, residing at Otterbein, in the county of Benton and State of Indiana, have invented certain new and useful Improvements in Cultivators; and I do hereby declare the following to be a full, clear, and exact description of the invention, such as will enable others skilled in the art to which it appertains to make and use the same.

The present invention relates to cultivators, more especially to cultivators of that type employed for working marshy or swampy lands, and has for its purpose to provide a means whereby such lands may be satisfactorily cultivated and without the usual unevenness and disagreeable features attending the tilling of such lands by the present used implements.

The invention has for its further purpose to provide an apparatus which will satisfactorily work or plow large tracts of land in one and the same operation; wherein the individual cultivators or plows are prevented from working irregular or becoming clogged; and wherein said cultivators or plows may be regulated for working at uniform depths.

The invention has for its further purpose to provide an apparatus which will be of simple design and durable construction, which may be readily manipulated without requiring unusual skill, and which will be comparatively inexpensive to manufacture.

With these and other objects in view, the invention consists in the novel details of construction and arrangement of parts more fully hereinafter disclosed and particularly pointed out in the claims.

Referring to the accompanying drawings forming a part of this specification in which like numerals designate like parts in all the views:— Figure 1 is a perspective view of the apparatus complete; Fig. 2 is a longitudinal sectional view taken on the line 2—2 of Fig. 1; Fig. 3 is a top plan view of the cultivator attaching frame which is carried by the stage; and, Fig. 4 is a transverse sec tional view of the complete apparatus taken on the line 4—4 of Fig. 1.

Referring to the construction in detail, the same consists of a platform or stage, and which will hereinafter be referred to as a stage, and which is constructed of a plu rality of trough-like sections 1, having each side flanges 2 coextensive in length therewith. The several trough sections are arranged in close parallel relation and united into a single structure through the medium of ribs 3, of substantially inverted U-shaped design in cross section. The structure is further reinforced through the medium of a plurality of clamping plates 4 which over-lie said ribs 3 adjacent the rear end of the structure, and are secured to the trough sections 1 by rivets 5, or in any other approved manner. The several sections 1 and ribs 3 are connected and further reinforced through the medium of a beam 6 disposed diagonally and transversely of the stage, and a similar beam 7 disposed transversely and at the fore part of the structure. That portion 8 of the stage in advance of the beam 7 is disposed slightly upwardly to the end that said stage may be dragged across the field to be cultivated more easily, and to avoid obstacles, as will be appreciated. The means for dragging the stage may consist of any mechanical or animal power connected to the draft appliance consisting of the chain 9 and draft bar 10. The stage, as shown by way of illustration in the accompanying drawing, may be constructed of metal throughout and in which instance the several elements above referred to will be of any appropriate sheet metal, but the stage may be constructed equally as well of wood and will give the same service.
A frame of substantially that design shown in Fig. 3, consists of a plurality of bars 11, 12 and 13 of relatively different lengths, and connected by a cross bar 14 at the fore end, and by cross members 15 at the rear end thereof. The frame is detachably connected to the stage at its forward end through the medium of a coupling bar 16, that passes through the registering openings of lugs 18 and 17 carried by said frame and beam 7 of the stage, respectively. At the rear end, said frame is connected to the stage by a bar 19 which passes through an aperture formed in one of the cross members 15 of the frame, as clearly illustrated in Figs. 1 and 2. Said cross members 15 are provided each with a pair of apertured lugs 16ᵃ designed to receive a rod 17ᵃ to which the cultivator, or plow, is hingedly connected. The cultivator which, in the instance shown, comprises gang plows, is connected to the several members 15 of the frame through the medium of the hinged rods 17ª, and disposed in stepped or diagonal relation transversely of the stage, and the shares 20 of said plows are located to work within the recesses X at the rear of the stage to provide which the rear end 21 of each trough 1 is cut away diagonally. In addition to the plows, the cultivator shown herein, is provided with colters 22 rigidly supported on the plow beams 23 and working between the stage sections in spaces 24 provided therebetween.

An elevating means is provided for regulating or setting the plow shares to work the earth at variable depths, and said means consists of a lever 25 secured to the plow beams by the bar 26 and carrying, by arms 27, a fulcrum roller which rests, and is shiftable, on one of the stage sections to vary the fulcrum point. The position of elevation of the plow shares, together with the colters 22, is secured through the medium of a ratchet bar 29 mounted on the plow beams, and a pawl 30 carried by the lever 25, which is adapted to be actuated by the usual device 31.

An apparatus constructed in accordance with the foregoing, and when used for cultivating marshy or soggy ground, operates to press or compact the earth due to the weight of the stage and cultivators supported thereby, and the earth thus pressed is firm and presents a flat surface, which can then be more effectively worked by the colters and plows which trail behind the stage in the process of cultivation. This construction of apparatus thus avoids the disadvantages attending the use of wheel cultivators in marshy lands where the ground is not sufficiently stable to support the wheels that carry the frames of the cultivating implements, with the consequence that the wheels, and sometimes the frames also, are buried in the wet, loose earth and absolutely prevent the plow from operating at all.

It is obvious that those skilled in the art may vary the details of construction and arrangement of parts, without departing from the spirit of my invention, and therefore, I do not wish to be limited to the above disclosures, except as may be required by the claims.

What I claim is:—

1. The combination with a cultivator of an earth compressing stage associated therewith and adapted to be dragged across and in contact with the ground with the cultivator in the cultivating operation, substantially as described.

2. The combination with a cultivator of an earth compressing stage connected to the cultivator and adapted to be dragged across and in contact with the ground in advance of the cultivator in the cultivating operation, substantially as described.

3. The combination with a cultivator of an earth compressing stage supporting the cultivator and adapted to be dragged across and in contact with the ground in advance of the cultivator; and means for elevating the cultivator to regulate the earth working depth thereof, substantially as described.

4. The combination with a cultivator of an earth compressing stage; a frame removably mounted on the stage; a cultivator connected to said frame and supported by the stage; said stage adapted to be dragged across and in contact with the ground in advance of the cultivator; and means for elevating the cultivator to regulate the earth working depth thereof, substantially as described.

5. The combination with a cultivator of an earth compressing stage; a frame removably mounted on the stage; a cultivator hingedly connected to said frame and located to work the earth at the rear of said stage; said stage adapted to be dragged across and in contact with the ground in advance of the cultivator; and a lever connected to the cultivator and fulcrumed on the stage; and means for elevating the cultivator to regulate the earth working depth thereof, substantially as described.

6. The combination with a plow of a stage constructed with a cut-away portion to receive the share of the plow; a hinged connection between the plow and the stage permitting the plow share to have working movement in said cut-away portion; said stage adapted to be dragged across the ground in advance of the plow in the plowing operation; and adjustable means for holding said plow share at different working elevations, substantially as described.

7. The combination with a gang plow of a stage constructed at its rear end to provide stepped recesses arranged transversely of the stage to receive the plow shares; a frame detachably mounted on the stage; hinged connections between the gang plow and said frame permitting of movement of the plow shares in said recesses; said stage adapted to be dragged across the ground in advance of the plow in the plowing operation; and adjustable means for holding the plow shares at different working elevations, substantially as described.

8. The combination with gang plows in multiple of a stage constructed at its rear end to provide stepped recesses arranged transversely of the stage to receive the shares of said gang plows; a frame detachably mounted on the stage; hinged connections between said frame and the gang plows permitting the plow shares to have movement in said recesses; said stage adapted to be dragged across the ground in advance of the plows in the plowing operation; and adjustable means for holding the plow shares at different working elevations, substantially as described.

In testimony whereof, I affix my signature, in presence of two witnesses.

SAMUEL B. McCORMICK.

Witnesses:
 MORRIS R. PARKS,
 GEO. D. PARKS.

Copies of this patent may be obtained for five cents each, by addressing the "Commissioner of Patents, Washington, D. C."